US006471380B1

(12) United States Patent
Henneboehle et al.

(10) Patent No.: US 6,471,380 B1
(45) Date of Patent: Oct. 29, 2002

(54) BLINK LAMP FOR VEHICLES

(75) Inventors: Klaus Henneboehle, Bueren; Martin Muegge, Geseke, both of (DE)

(73) Assignee: Hella KG Hueck & Co., Lippstadt (DE)

(*) Notice: Subject to any disclaimer, the term of this patent is extended or adjusted under 35 U.S.C. 154(b) by 0 days.

(21) Appl. No.: 09/645,547

(22) Filed: Aug. 25, 2000

(30) Foreign Application Priority Data

Aug. 26, 1999 (DE) ........................................ 199 40 410

(51) Int. Cl.$^7$ ................................................. B60Q 1/56

(52) U.S. Cl. ....................... 362/498; 362/336; 362/339; 362/509; 362/522

(58) Field of Search ................................ 362/498, 487, 362/495, 509, 522, 544, 520, 326, 336, 337, 339

(56) References Cited

U.S. PATENT DOCUMENTS 4,530,041 A * 7/1985 Yamai et al. ............... 362/230
5,692,824 A * 12/1997 Ooishi ......................... 362/80

FOREIGN PATENT DOCUMENTS

EP B1-0587501 3/1994

* cited by examiner

*Primary Examiner*—Sandra O'Shea
*Assistant Examiner*—John Anthony Ward
(74) *Attorney, Agent, or Firm*—Birch, Stewart, Kolasch & Birch, LLP

(57) ABSTRACT

A blink lamp is arranged on a comer of a motor vehicle, at a side next to a headlight, and has a housing with a light-transmissive cover panel covering the housing. A prismatic light element is arranged inside the blink lamp on a side adjacent to the headlight and adjacent to the cover panel. The prismatic light element bends beams of light coming directly from the light source toward the cover panel and toward the headlight.

13 Claims, 4 Drawing Sheets

VIEW X

VIEW Y

BLINK LAMP FOR VEHICLES

BACKGROUND OF THE INVENTION

This application claims a foreign priority based on German application serial number 199 40 410.0, filed on Aug. 26, 1999, and the disclosure in that application is incorporated herein by reference.

This invention relates to a blink lamp for vehicles mounted on a comer of a vehicle at a side next to a headlight, with a light source arranged in an interior of a housing, with a light-transmissive cover panel over the housing and with a prismatic light element arranged at a side of the blink lamp adjacent to the headlight, for directing beams of the light source laterally.

Such a blink lamp for motor vehicles is known from European Patent publication No. EP 0587 501 B1. The blink lamp is arranged at a side of a headlight in a body opening in a front comer area of the vehicle body. The blink lamp serves as a separate light module which has a light panel equipped with optical elements mounted in an interior between a reflector and an outer cover panel. The light guide element is structured in one piece with the light panel and is directed toward the cover panel on the side of the blink lamp adjacent to the headlight. Beams of light from a reflector-oriented light source, reflected from the reflector, enter the light guide element at the light panel. After being totally reflected to a free end of the light guide element, the beams of light travel perpendicular to a longitudinal axis of the vehicle and are directed away from the headlight. Therefore, this blink lamp can be seen well from the side of the vehicle.

Since front blink lamps are increasingly being arranged in corner areas of car bodies, and indeed in areas with greater pitches and slopes of the bodies, either as separate lights or integrated into headlights, the problem has been exacerbated that light values toward centers of vehicles as specified by law (up to an angle of 45° to the longitudinal axis of the vehicle) can no longer be achieved easily.

Until now, almost all known blink lamps have been structured with parabolic reflectors and cover panels having diffusing optical properties (optics). In addition, these blink lamps have usually been separate lights. With this solution, there is practically no problem in meeting the 45° light values. This is especially problem-free with known lights which are mounted in bumpers of vehicles, because then cover panels do not have great inclinations or pitches to relative to longitudinal axes of vehicles.

With the increasing trend toward integration of blink lamps into headlights and a design freedom achieved by using cover panels made of resinous plastic, which allows much greater design options than glass covers, it has become increasingly difficult to achieve the corresponding 45° light values. Furthermore, due to the fact that these lights are often integrated into headlights, the installation sites are frequently in comer areas of vehicle bodies, where there are physical limits to reflecting the light up to 45°, due to the pitch and inclination of the cover panel.

With many known automotive lights, vehicle designers place great value on having glass-clear, optic-free, designs for headlights. If blink lamps are integrated into headlights, they should also have a style that is free of optics. The "normal" light distribution (central area) is produced in these solutions by reflector optics on a parabolic, or by free-surface, reflectors. However, the 45° problem still remains.

To meet minimum statutory requirements, designers have previously often had to accept small optic areas in cover panels. With such known lamps, there has been a separate blink lamp arranged next to the headlight with a free-form reflector, but nevertheless there has been an additional vertically-extending, cylindrical, optics element in a front area of the cover panel to achieve scattered light for the 45° light values required by law.

The same principle has also been used with known blink lamps which have been integrated into headlights. This optical system has then been located at the center of the cover panel, or in a transitional area of the cover panel from the blink lamp to the low-beam headlight. However, an optic on a cover panel always has an interfering effect in illumination.

There are also known blink lamps for motor vehicles where such optic elements are not necessary because of certain prerequisites. This is the case with the blink lamp known from European Patent No. EP 0 587,501 B1, for example, because an optical system with an additional light panel with optics is used here, and a front blinder shield edge between the blink lamp and the low-beam headlight is positioned far enough to the rear. If this blinder shield edge would lie directly on the cover panel, it would be necessary to have a diffusor in the cover panel in order to achieve the specified 45° light values.

With blink lamps which have an extremely unfavorable geometry (pitch/inclination), vertical cylindrical optics elements can often no longer achieve the desired effect. Under some circumstances, prism strips must even be mounted in a diffusor, but they create an even more disturbing stylistic effect. Furthermore, optics in a light-transmissive cover panel might not have any effect at all with unfavorable geometric relationships and arrangements of a light source provided for the reflector.

It is an object of this invention to provide a blink lamp for motor vehicles for being arranged at a corner of a vehicle, at a side, next to a headlight, with a light source arranged in a interior of a housing, with a light-transmissive cover panel covering the housing and with a prismatic light element arranged on a side of the blink lamp next to the headlight, directing beams of light from the light source toward the side such that statutory requirements for the light values directed toward the center of the vehicle are met even when the cover panel has no special optics and optics in an intermediate panel and/or in the reflector would not be sufficient.

SUMMARY OF THE INVENTION

According to principles of this invention, this object is achieved by arranging a prismatic light element next to an inside of the cover panel, which refracts beams of light coming directly from the light source being reflected toward the cover panel and the headlight side of the blink lamp. When integrated into a headlight, and for a separate blink lamp, the blink lamp is often arranged at an outer area of the headlight. With such an arrangement of the blink lamp and the design of this invention

- the blink lamp may be structured to be very narrow
- the cover panel may have a greater pitch and/or inclination in the blink lamp area than is possible with traditional blink lamps,
- a shield between the blink lamp and the headlight may extend up to the cover panel,
- the entire cover panel of the headlight may have a clear design without optics, apart from any decorative optics.

In addition, it is expedient if the blink lamp is structured with a reflecting optic element on a reflective surface of the reflector.

In an especially advantageous enhancement of the invention, the prism-like light element is formed by an edge section of a light panel mounted in the front area of a shield extending between the blink lamp and the headlight. It is expedient here if the light panel is arranged in a window that is open toward the headlight and is provided with a light-bundling optic (such as a Fresnel lens) on a side facing the incandescent lamp. This optic directs the beams of light of the light source through an additional light panel (direction of a low-beam light reflector). The light panel has a light diffusing optic element on a side facing the low-beam light reflector, so an interior of the headlight is illuminated. The prismatic light element is a crucial element in ensuring the 45° light values, with the light-beam bundling and diffusing optic element of the light panel being an additional supportive element.

With a separate blink lamp, it is advantageous if the prismatic light element or a light panel carrying the prismatic light element is mounted on a sidewall next to the headlight. It is especially advantageous if the prismatic light element is integrally molded on an inside of the cover panel.

BRIEF DESCRIPTION OF THE DRAWINGS

The invention is described and explained in more detail below using an embodiment shown in the drawings. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout. The drawings are not necessarily to scale, emphasis instead being placed upon illustrating principles of the invention in a clear manner.

DESCRIPTION OF A PREFERRED EMBODIMENT

Figure 1:
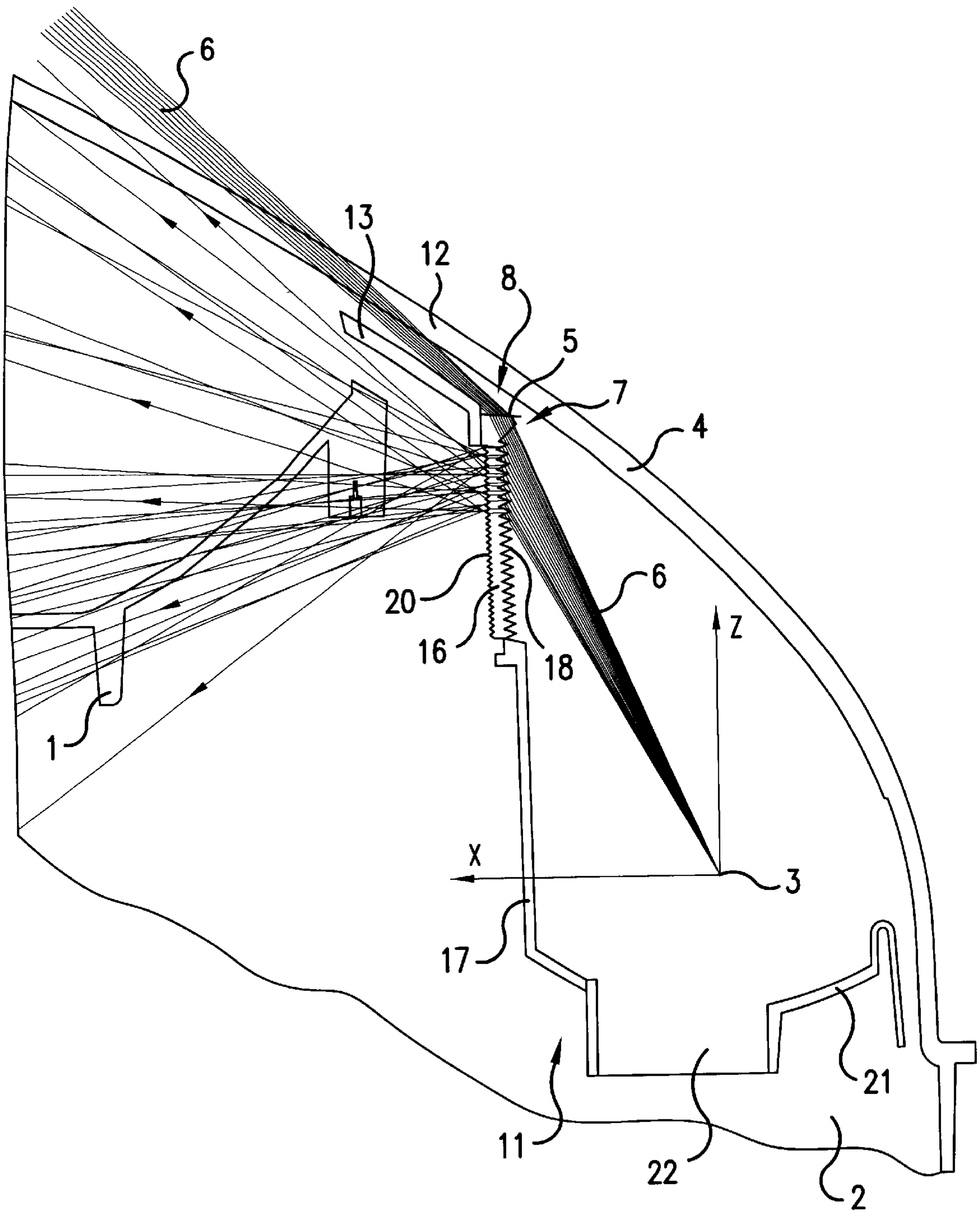
FIG. 1 is a horizontal central section taken through a blink lamp which is arranged at a side next to a headlight and is arranged together with the headlight behind a common cover panel.
Figure 2:
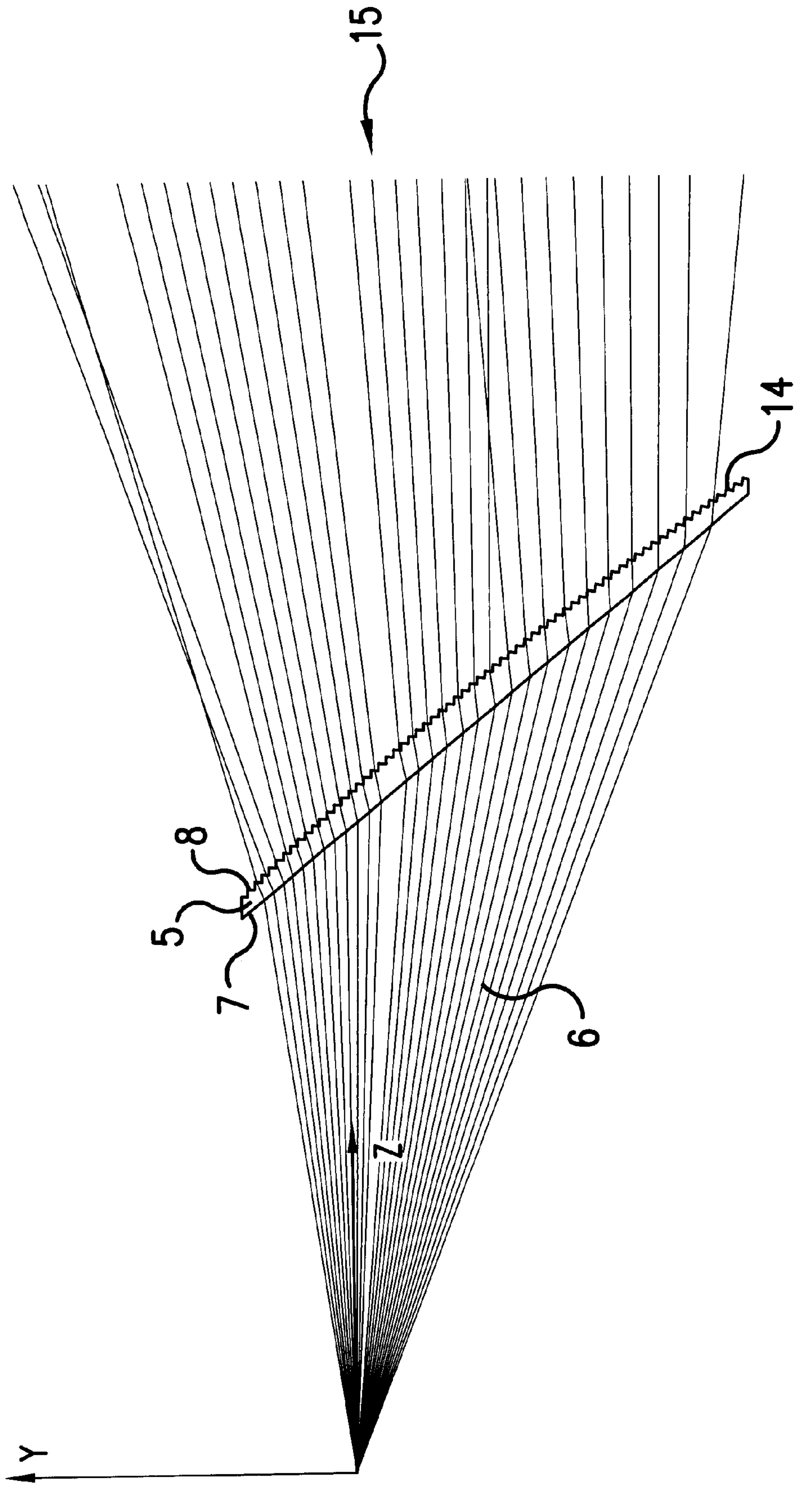
FIG. 2 is a vertical section taken through a prismatic light element adjacent the cover panel of the blink lamp.
Figure 3:
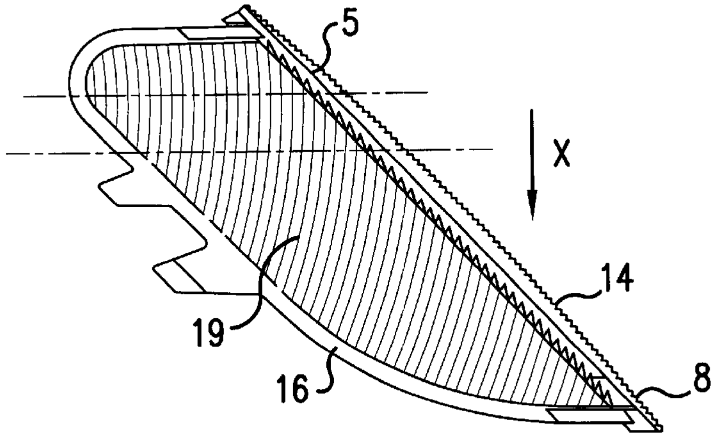
FIG. 3 is a side view of a light panel of the blink lamp with the light element from FIG. 2, which is structured in one piece with the light panel.
Figure 4:
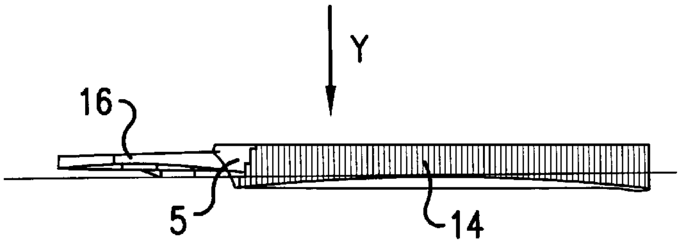
FIG. 4 is a view from direction X in FIG. 3.
Figure 5:
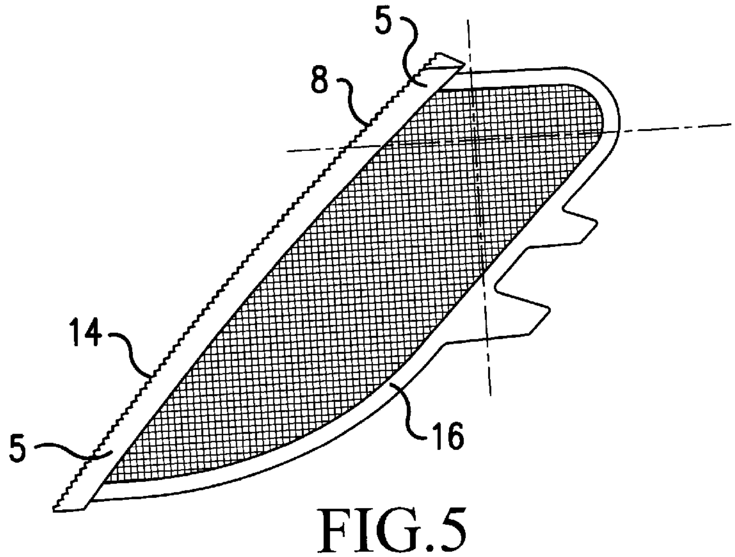
FIG. 5 is a view from direction Y in FIG. 4.

FIG. 1 shows a blink lamp 11 for a motor vehicle, arranged together with a headlight 1 behind a transparent, optics-free, cover panel 4. Thus, the headlight 1 and the blink lamp 11 together form a light unit. The light unit can be inserted into a vehicle body opening, with the blink lamp 11 being arranged on a corner of the vehicle at a side near the headlight 1. The optics-free cover panel 4 is adapted to a shape of the vehicle and extends in every direction at an angle to the longitudinal axis of the vehicle. The blink lamp 11 has a dish-shaped reflector 21 with an opening 22 in a crown area to accommodate a light source 3 which may be an incandescent light bulb. In the case of an incandescent light bulb, the light source 3 is formed by an incandescent filament which lies at a focal spot of the dish-shaped reflector 21. The blink lamp 11 has a vertical side wall 17 extending parallel to a longitudinal axis of the vehicle next to the headlight 1. The side wall 17 is formed as one piece with the dish-shaped reflector 21 and with a blinder shield 13 surrounding the headlight 1. A window to receive a light panel 16 is in the side wall 17 next to the shield 13. The Light panel 16 has a prismatic light element 5 on its edge portion next to the cover panel 2. The prismatic light element 5 tapers toward the cover panel 4 and has a light input face 7 and a light output face 8. The light input face 7 faces the light source 3. Beams of light 6 coming directly from the light source 3, which fall on the prismatic light element 5, are refracted, or bent, toward the headlight. The prismatic light element 5 tapers, starting from its center, toward the top and the bottom and has prism steps 14 on its light output face 8 to produce a vertically diverging light bundle 15. The prismatic light element 5 extends equidistant from the cover panel 4 and forms a small gap together with the cover panel 4. The light panel 16 has prisms 18 on its side facing an interior of the blink lamp 11, directing beams of light 6 coming directly from the light source 3 toward an interior of the headlight 1. On a side facing the headlight 1, the light panel 16 has light dispersing optical elements 20. Beams of light penetrating into the interior of the headlight 1 illuminate the headlight 1 and together with the beams of light 6 refracted by the prismatic light element 5, produce light values required by law toward the center of the vehicle. The beams of light 6 bent by the prismatic light element 5 pass through a portion 12 of the light panel adjacent the shield 13.

Figure 6:
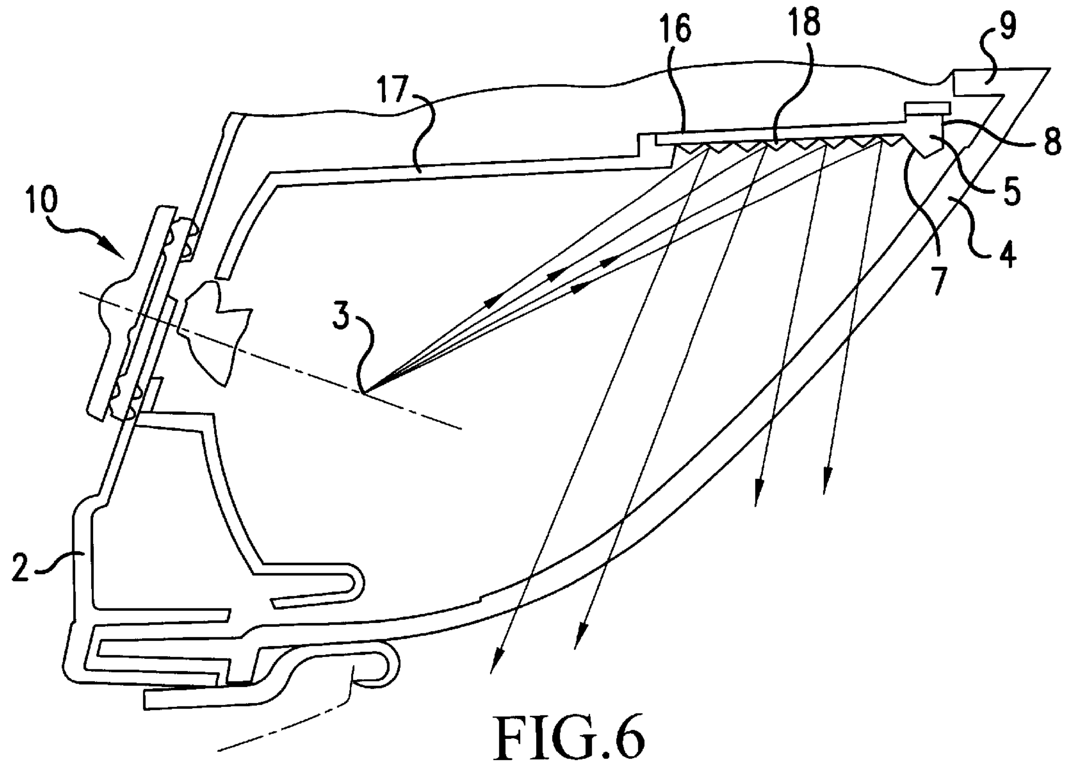
FIG. 6 is a horizontal section through a separate blink lamp that can be arranged at the side next to a headlight.

The blink lamp 11 illustrated in FIG. 6 is arranged next to a headlight at the side and is a separate light unit. The blink lamp 10 differs from blink lamp 11 essentially in the following features: The light panel 16 positioned in the window of the side wall 17 has optical elements 18 which reflect beams of light coming from the light source 3 toward the side of the vehicle. Thus, the blink lamp 10 also has a function of indicating the side of the vehicle.

The optical elements 18 may also be structured so that they serve as side marking reflectors. The light panel 16 is colored yellow in an area of the optical elements 18, and total-reflecting prisms serve as the optical elements 18. The reflector optics lie on the back side of the light panel 16.

Figure 7:
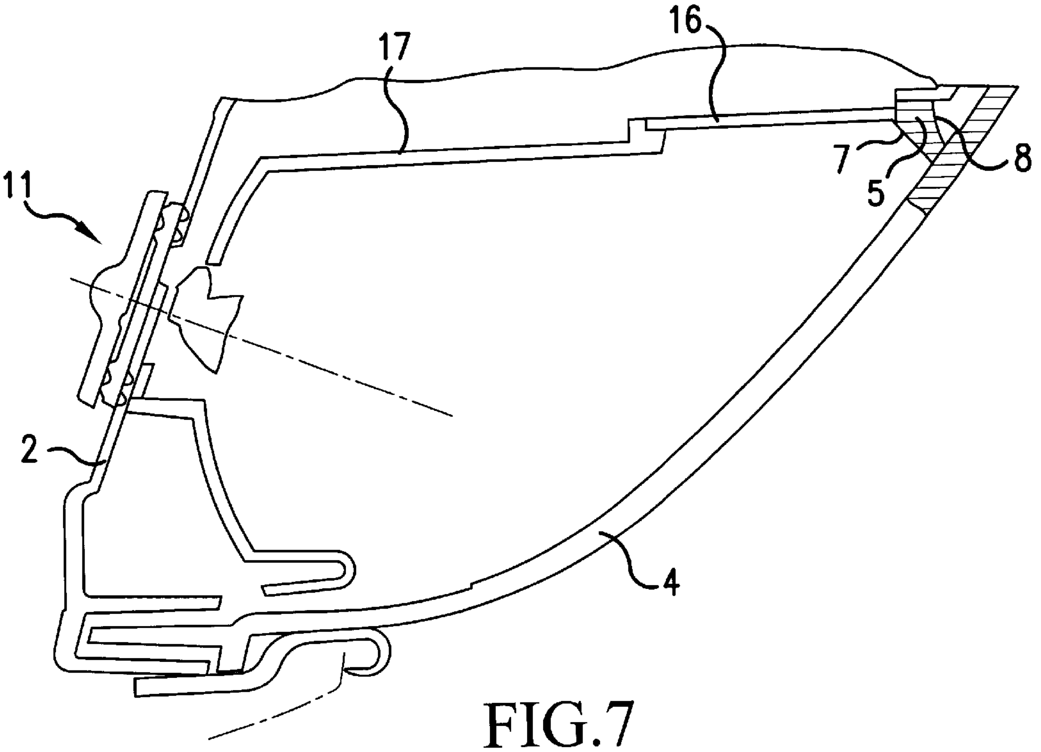
FIG. 7 is a horizontal section through another blink lamp that can be arranged next to a headlight at the side.

In the blink lamp 11 illustrated in FIG. 7, the prismatic light element 5 is integrally molded on the inside of cover panel 4. The cover panel 4 is preferably made of resinous plastic.

We claim:

1. Blink lamp for a motor vehicle for being arranged at a corner of the vehicle, at a side, next to a headlight (1) of the vehicle, with a light source (3) arranged in an interior of a housing (2), said blink lamp providing a legally-prescribed light value distribution directed toward the motor vehicle middle requiring visibility at angles of up to around 45° to either side of the vehicle middle with a light-transmissive cover panel (4) covering the housing (2) that is free of optical elements for substantially modifying a direction of light traveling therethrough and with a prismatic light element (5) arranged on a side of the blink lamp (10 or 11) to be next to the headlight (1) directing beams of light from the light source (3) toward the side, wherein the prismatic light element (5) is arranged adjacent to an inside of the light-transmissive cover panel (4) and bends beams of light (6) coming directly from the light source (3) toward the light-transmissive cover panel (4) and toward a side of the blink lamp to be next to the headlight (1), wherein the prismatic light element (5) is an elongated member with a light input face (7) thereof being directed toward the light source (3); and wherein the prismatic light element (5) is formed as an edge section (9) of a transparent light panel (16) having other optical elements thereon, which is mounted in a side wall (17) of the housing defining an interior of the blink lamp (10 or 11), the transparent light panel extending substantially in a direction of light output of the blink lamp (10 or 11).

2. Blink lamp of claim 1, wherein the prismatic light element (5) tapers outwardly toward the light-transmissive cover panel (4) near the light-transmissive cover panel (4), with different inclinations of the light input face (7) and a light output face (8) relative to one another.

3. Blink lamp of claim 1, wherein the light-transmissive cover panel (4) covers only the housing (2) of the blink lamp (10), the prismatic light element (5) bends beams of light (6) coming directly from the light source (3) to a side edge section (9) of the light-transmissive cover panel (4) to be adjacent to the headlight (1), in dependence on the shape and position of the prismatic light element in paths of the beams.

4. Combination of a headlight and the blink lamp of claim 1, wherein the blink lamp (11) is arranged together with the headlight (1) behind the light-transmissive cover panel (4), the prismatic light element (5) bending beams of light (6) coming directly from the light source (3) to a portion (12) of the light-transmissive cover panel (4) extending between the blink lamp (11) and the headlight (1).

5. Combination of claim 4, wherein said side wall (17) is formed as one piece with a shield (13) extending between the blink lamp (11) and the headlight (1) and being next to the light-transmissive cover panel (4).

6. Blink lamp of claim 1, wherein the light-transmissive cover panel is curved and the prismatic light element (5) extends equidistant from an inside of the curved light-transmissive cover panel (4).

7. Blink lamp of claim 1, wherein the prismatic light element (5) has horizontally-extending prism steps (14) that produce a vertically-diverging light bundle (15) at a light output face (8) facing away from the light source (3).

8. Blink lamp of claim 1, wherein the prismatic light element (5) tapers from its center upwardly and downwardly.

9. Blink lamp of claim 1, wherein the prismatic light element (5) has an output face directed in a direction of light output of the blink lamp (10 or 11).

10. Blink lamp according to claim 1, wherein some of the other optical elements (18) serve as a side marking light by reflecting beams of light coming directly from the light source (3) toward the side of the vehicle.

11. Blink lamp of claim 1, wherein the light panel (16) is arranged in a window of the side wall (17) of the housing of the blink lamp (10 or 11), said window being open toward the headlight (1).

12. Blink lamp of claim 1, wherein first ones of the other optical elements (19) collect beams of light (6) from the light source (3) on the side facing the interior of the blink lamp (10 or 11), and second ones of the optical elements (20) disperse the beams of light (6) on the side facing away from the interior of the blink lamp (10 or 11).

13. Blink lamp of claim 1, wherein some of the other optical elements (18) are in an area that is colored yellow and are arranged on a side of the light panel (16) facing away from the blink lamp as total-reflecting prisms serving as retro-reflectors for indicating a side of the vehicle.

* * * * *